(12) United States Patent
Navratil et al.

(10) Patent No.: US 8,139,344 B2
(45) Date of Patent: Mar. 20, 2012

(54) ELECTROLYTIC CAPACITOR ASSEMBLY AND METHOD WITH RECESSED LEADFRAME CHANNEL

(75) Inventors: Jiri Navratil, Veseli nad Moravou (CZ); Jaroslav Tomasko, Lanskroun (CZ); Stanislav Zednicek, Lanskroun (CZ)

(73) Assignee: AVX Corporation, Myrtle Beach, SC (US)

( * ) Notice: Subject to any disclaimer, the term of this patent is extended or adjusted under 35 U.S.C. 154(b) by 349 days.

(21) Appl. No.: 12/556,688

(22) Filed: Sep. 10, 2009

(65) Prior Publication Data
US 2011/0058310 A1  Mar. 10, 2011

(51) Int. Cl.
*H01G 9/042* (2006.01)
(52) U.S. Cl. ........ 361/528; 361/516; 361/519; 361/523; 361/525; 361/529
(58) Field of Classification Search .......... 361/528, 361/516–519, 523, 525, 530–531, 540–541; 29/25.01, 25.03
See application file for complete search history.

(56) References Cited

U.S. PATENT DOCUMENTS

| | | |
|---|---|---|
| 2,936,514 A | 5/1960 | Millard |
| 3,345,545 A | 10/1967 | Bourgault et al. |
| 3,588,628 A | 6/1971 | Beck |
| 3,781,976 A | 1/1974 | Tomiwa |
| 3,789,274 A | 1/1974 | Pfister |
| 3,828,227 A | 8/1974 | Millard et al. |
| 3,997,821 A | 12/1976 | Sternbeck |
| 4,017,773 A | 4/1977 | Cheseldine |
| 4,085,435 A | 4/1978 | Galvagni |
| 4,107,762 A | 8/1978 | Shirn et al. |
| 4,247,883 A | 1/1981 | Thompson et al. |
| 4,288,842 A | 9/1981 | Voyles |
| 4,488,204 A | 12/1984 | Beck, Jr. |
| 4,497,105 A | 2/1985 | Uemura |
| 4,571,662 A | 2/1986 | Conquest et al. |
| 4,675,790 A | 6/1987 | DeMatos et al. |
| 4,945,452 A | 7/1990 | Sturmer et al. |
| 4,972,299 A | 11/1990 | Hagiwara et al. |
| 5,198,968 A | 3/1993 | Galvagni |
| 5,349,496 A | 9/1994 | Taniguchi et al. |
| 5,357,399 A | 10/1994 | Salisbury |

(Continued)

FOREIGN PATENT DOCUMENTS

EP    1061537 A2    12/2000

(Continued)

OTHER PUBLICATIONS

Abstract of Japanese Patent No. JP01-227422, Mar. 7, 1988.

(Continued)

*Primary Examiner* — Nguyen T Ha
(74) *Attorney, Agent, or Firm* — Dority & Manning, P.A.

(57) ABSTRACT

A solid electrolytic capacitor has a capacitor body formed from a pressed anode, a dielectric layer and a solid electrolyte layer. An anode lead extends from anode pellet and is electrically connected to an anode termination. The outer surface of the capacitor body forms a cathode that is electrically connected to a cathode termination. Base anode and cathode termination portions are coplanar and connected with a recessed leadframe channel. A capacitor element is attached to the anode and cathode termination portions and encapsulated. The recessed leadframe channel is removed to isolate the anode and cathode terminations on a single mounting surface, leaving a surface groove formed between the anode and cathode terminations.

12 Claims, 4 Drawing Sheets

U.S. PATENT DOCUMENTS

| | | | |
|---|---|---|---|
| 5,390,074 | A | 2/1995 | Hasegawa et al. |
| 5,394,295 | A | 2/1995 | Galvagni et al. |
| 5,457,862 | A | 10/1995 | Sakata et al. |
| 5,461,537 | A | 10/1995 | Kobayashi et al. |
| 5,473,503 | A | 12/1995 | Sakata et al. |
| 5,495,386 | A | 2/1996 | Kulkarni |
| 5,729,428 | A | 3/1998 | Sakata et al. |
| 5,812,367 | A | 9/1998 | Kudoh et al. |
| 5,840,086 | A | 11/1998 | Takami et al. |
| 5,949,639 | A | 9/1999 | Maeda et al. |
| 6,017,367 | A | 1/2000 | Nakata |
| 6,191,936 | B1 | 2/2001 | Webber et al. |
| 6,197,252 | B1 | 3/2001 | Bishop et al. |
| 6,236,561 | B1 | 5/2001 | Ogino et al. |
| 6,262,878 | B1 | 7/2001 | Shirashige et al. |
| 6,322,912 | B1 | 11/2001 | Fife |
| 6,333,844 | B1 | 12/2001 | Nakamura |
| 6,346,127 | B1 | 2/2002 | Kuriyama |
| 6,380,577 | B1 | 4/2002 | Cadwallader |
| 6,391,275 | B1 | 5/2002 | Fife |
| 6,400,556 | B1 | 6/2002 | Masuda et al. |
| 6,416,730 | B1 | 7/2002 | Fife |
| 6,430,034 | B2 | 8/2002 | Sano et al. |
| 6,467,142 | B1 | 10/2002 | Shirashige et al. |
| 6,477,030 | B2 | 11/2002 | Hidaka et al. |
| 6,493,213 | B1 | 12/2002 | Clasen et al. |
| 6,519,135 | B2 | 2/2003 | Sano et al. |
| 6,527,937 | B2 | 3/2003 | Fife |
| 6,574,093 | B2 * | 6/2003 | Kida et al. ................... 361/516 |
| 6,576,099 | B2 | 6/2003 | Kimmel et al. |
| 6,592,740 | B2 | 7/2003 | Fife |
| 6,616,713 | B2 | 9/2003 | Sano et al. |
| 6,625,009 | B2 | 9/2003 | Maeda |
| 6,639,787 | B2 | 10/2003 | Kimmel et al. |
| 6,674,635 | B1 | 1/2004 | Fife et al. |
| 6,680,841 | B2 | 1/2004 | Tadanobu et al. |
| 6,717,793 | B2 | 4/2004 | Arai et al. |
| 6,751,086 | B2 | 6/2004 | Matsumoto |
| 6,808,541 | B2 | 10/2004 | Maeda |
| 6,870,727 | B2 | 3/2005 | Edson et al. |
| 6,870,728 | B1 | 3/2005 | Burket et al. |
| 6,882,521 | B2 | 4/2005 | Tsutsui et al. |
| 6,891,717 | B2 | 5/2005 | Fujii et al. |
| 6,903,921 | B2 | 6/2005 | Ishijima |
| 6,903,922 | B2 | 6/2005 | Sano et al. |
| 6,920,037 | B2 | 7/2005 | Sano et al. |
| 6,970,345 | B2 | 11/2005 | Oh et al. |
| 6,992,880 | B2 | 1/2006 | Tadanobu et al. |
| 6,995,972 | B2 * | 2/2006 | Fujii et al. ................... 361/540 |
| 7,027,291 | B2 | 4/2006 | Horio et al. |
| 7,057,882 | B2 | 6/2006 | Fujii et al. |
| 7,116,548 | B2 | 10/2006 | Satterfield, Jr. et al. |
| 7,149,077 | B2 | 12/2006 | Ishijima |
| 7,158,368 | B2 | 1/2007 | Fujii et al. |
| 7,220,397 | B2 | 5/2007 | Kimmel et al. |
| 7,262,511 | B2 | 8/2007 | Osako et al. |
| 7,271,995 | B2 | 9/2007 | Edson et al. |
| 7,320,924 | B2 * | 1/2008 | Kida et al. ................... 438/396 |
| 7,341,705 | B2 | 3/2008 | Schnitter |
| 7,352,562 | B2 * | 4/2008 | Tanaka ........................ 361/540 |
| 7,381,396 | B2 | 6/2008 | Thomas et al. |
| 7,419,926 | B2 | 9/2008 | Schnitter et al. |
| 7,449,032 | B2 | 11/2008 | Vaisman et al. |
| 7,460,358 | B2 | 12/2008 | Biler |
| 7,515,396 | B2 | 4/2009 | Biler |
| 2003/0104923 | A1 | 6/2003 | Omori et al. |
| 2008/0062617 | A1 | 3/2008 | Edson et al. |
| 2008/0247122 | A1 | 10/2008 | Vaisman et al. |

FOREIGN PATENT DOCUMENTS

| | | |
|---|---|---|
| GB | 2123610 A | 2/1984 |
| JP | 5547449 | 11/1980 |
| JP | 129050 | 6/1989 |
| JP | 01276613 | 7/1989 |
| JP | 5234828 | 9/1993 |
| JP | H7106204 | 4/1995 |
| JP | H1187175 | 3/1999 |
| JP | 11288844 | 10/1999 |

OTHER PUBLICATIONS

Abstract of Japanese Patent No. JP02-087612, Sep. 11, 1989.
Abstract of Japanese Patent No. JP06-005478, Jan. 14, 1994.
Abstract of Japanese Patent No. JP08-130166, May 21, 1996.
Abstract of Japanese Patent No. JP2000049048, Feb. 18, 2000.
Abstract of Japanese Patent No. JP2001291641, Oct. 19, 2001.
Abstract of Japanese Patent No. JP2001110676, Apr. 20, 2001.
Abstract of Japanese Patent No. JP7106204, Apr. 21, 1995.
Abstract of Japanese Patent No. JP7240343, Sep. 12, 1995.
Article—*Adsorption of Gases in Multimolecular Layers*, Brunauer et al., The Journal of the American Chemical Society, vol. 60, Jan.-Jun. 1938, pp. 309-319.
Related U.S. Patent Application Form.
UK Search Report for GB1013520.0 dated Dec. 10, 2010, 3 pages.

* cited by examiner

ELECTROLYTIC CAPACITOR ASSEMBLY AND METHOD WITH RECESSED LEADFRAME CHANNEL

BACKGROUND OF THE INVENTION

Electrolytic capacitors are traditionally known for their high capacitance value and compactness. Despite the existing compactness of known electrolytic capacitors and electrolytic capacitor arrays, there are constant efforts to reduce the volume and corresponding volumetric efficiency of such electronic components.

Exemplary components of a conventional electrolytic capacitor include a main capacitor body including respective anode and cathode portions, an anode lead (e.g., an anode wire embedded in the capacitor body), and a cathode lead (e.g., a leadframe connected to the cathode portion) all molded together in an encapsulating resin package. The volumetric efficiency of an electrolytic capacitor is typically defined as the ratio of the main capacitor body volume to the volume of the entire molded capacitor package. The anode and cathode leads of such capacitors form respective positive and negative electrical connections to the capacitor structure. These electrical connections sometimes extend axially from the capacitor structure, and in such cases can take up a significant amount of space inside the capacitor package.

In other electrolytic capacitor configurations, the anode and cathode leads are arranged to accommodate surface mounting of the electrolytic capacitor, which can be especially useful when electrolytic capacitors are employed in any type of integrated circuit environment. Thus, chip-type electrolytic capacitors have been designed not only with volumetric performance characteristics in mind, but also such that device mounting to a substrate is facilitated. Such facilitated device mounting is often achieved by configuring both electrical terminations to extend from a selected surface of the capacitor. Several known examples employ substantially coplanar termination arrangements that facilitate surface mounting of an electrolytic capacitor to a substrate.

While various configurations of surface-mount electrolytic capacitors exist, a need remains for a capacitor system and corresponding method of manufacture that provides further improvements in volumetric efficiency, device profile and electrical performance characteristics.

SUMMARY OF THE INVENTION

In one exemplary embodiment of the present invention, a method for forming a solid electrolytic capacitor comprises attaching a capacitor element having a capacitor body and an anode lead to a leadframe. The leadframe comprises an anode termination having at least a base anode termination portion for supporting part of the capacitor body and an upstanding anode termination portion for connecting to the anode lead, a cathode termination having at least a base cathode termination portion for supporting part of the capacitor body, and a recessed leadframe channel formed between and connecting the base anode termination portion and the base cathode termination portion. The exemplary method further comprises encapsulating the capacitor element in a casing such that at least a portion of the base anode termination portion, base cathode termination portion and recessed leadframe channel remain exposed. Still further, the recessed leadframe channel is removed to isolate the anode and cathode terminations.

In another exemplary embodiment of the present invention, a solid electrolytic capacitor comprises a solid electrolytic capacitor element, a leadframe, encapsulating material and a surface groove. The solid electrolytic capacitor element includes a capacitor body characterized by first and second opposing end surfaces and an anode lead extending from the first end surface of the capacitor body. The leadframe comprises an anode termination and a cathode termination. The anode termination comprises an upstanding anode termination portion and a base anode termination portion that is substantially perpendicular to the upstanding anode termination portion, wherein the upstanding anode termination portion is electrically connected to the anode lead such that the upstanding anode termination portion is substantially parallel with the first end surface of the solid electrolytic capacitor element. The cathode termination is electrically connected to the capacitor body, wherein the cathode termination comprises at least a base cathode termination portion that is formed in substantially the same plane as the base anode termination portion. The encapsulating material substantially surrounds the solid electrolytic capacitor element to form a device package, wherein a portion of the base anode termination portion and the base cathode termination portion are exposed from the encapsulating material on a given mounting surface. The surface groove is formed between the base anode termination portion and said base cathode termination portion.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
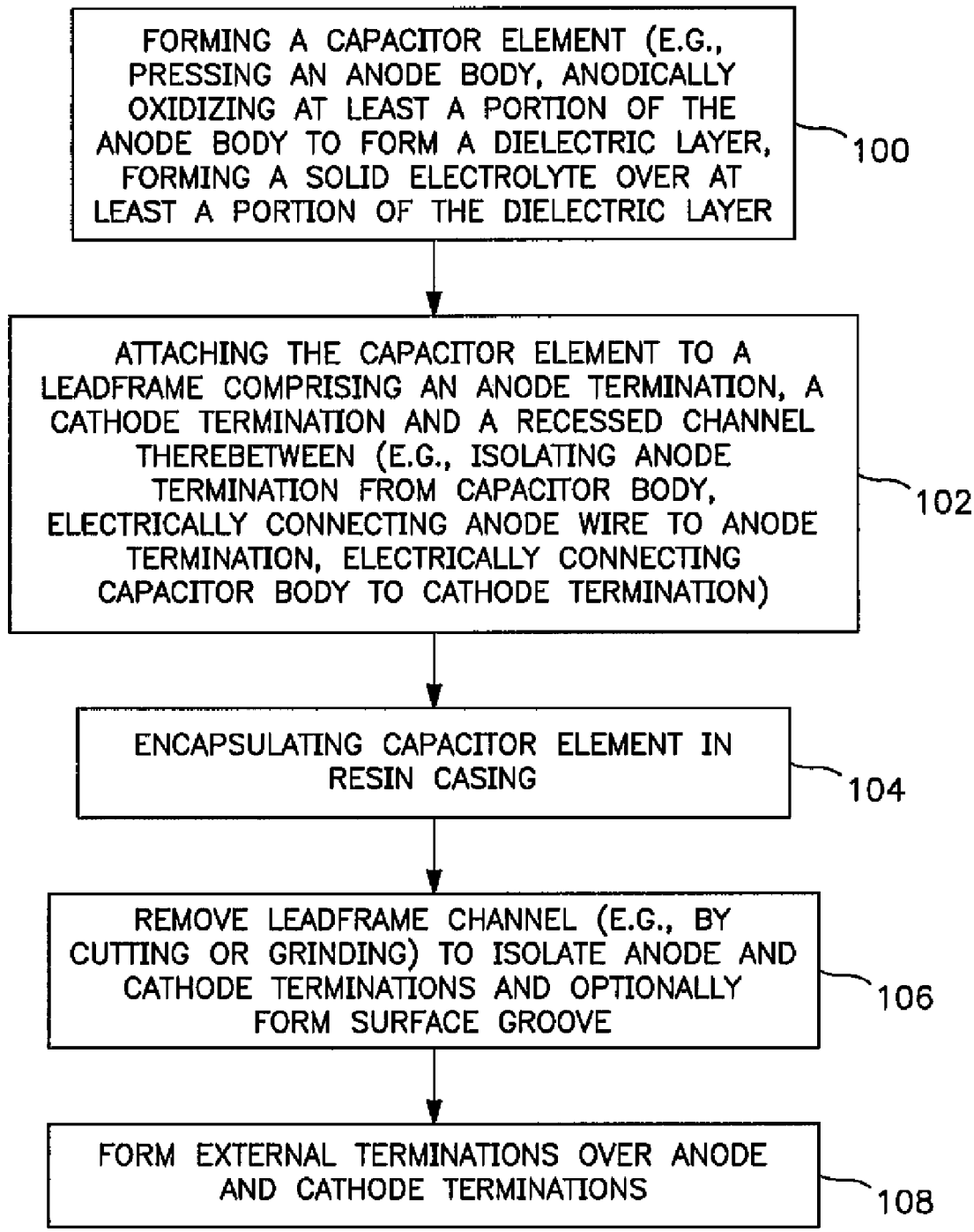
FIG. 1 is a flow chart of exemplary steps that may be employed in a method of forming electrolytic capacitors of the present invention.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor with a surface mountable configuration and improved volumetric efficiency. The capacitor includes a capacitor element containing an anode formed from a valve metal composition, a dielectric film overlying the anode, and a solid electrolyte overlying the dielectric film. The solid electrolyte or other outer surface forms a cathode for the capacitor element. The capacitor element is characterized by first and second opposing end surfaces. An anode lead (e.g., an anode wire) is embedded in the anode and extends from the first end surface of the capacitor element.

A leadframe is provided to form respective anode and cathode terminations for the capacitor. An anode termination is electrically connected to the anode lead and configured with a base anode termination portion and an upstanding anode termination portion. The upstanding anode termination portion is electrically connected to the anode lead and is substantially parallel to the first end surface of the capacitor body. The base anode termination portion may be provided in a surface mount location and in a substantially perpendicular relationship to the upstanding anode termination portion. The base anode termination portion is also provided to support a portion of the capacitor body with insulating material between the capacitor body and the anode termination so as not short circuit the capacitor. The cathode termination includes a base cathode termination portion for supporting part of the capacitor body and connecting to the cathode (outer surface) of the capacitor body. An optional upstanding cathode termination portion may be provided that is substantially perpendicular to the base cathode termination portion and adjacent to the second end surface of the capacitor body. The base cathode termination portion and base anode termination portion may be substantially coplanar.

The leadframe also includes a recessed channel formed between and connecting the base anode termination portion and the base cathode termination portion. For example, the recessed channel may include at least a portion that extends for some given width away from the capacitor body and the plane in which the base anode termination portion and base cathode termination portion are formed. The recessed channel may have a generally rectangular cross section, a U-shaped cross section, V-shaped cross section or other configuration.

Encapsulation material (such as a molded resin package) is formed to create a device package. The encapsulation is formed to substantially surround the capacitor body leaving only the base anode termination portion, base cathode termination portion and recessed leadframe channel exposed on a single surface of the device package. At least a portion of the recessed leadframe channel may then be removed to isolate the anode and cathode terminations. In one example, the recessed leadframe channel is cut and/or a surface groove is formed along the device package between the base anode termination and the base cathode termination. External terminations may optionally be applied over the exposed base anode and cathode termination portions. Such an exemplary configuration provides for termination features that allow for surface mounting and circuit attachment at a single device surface, keeping all sides free of metal parts to reduce short circuit risk to other parts in a mounting environment.

The present invention is equally concerned with methods for forming solid electrolytic capacitors, which may be formed using any of a variety of techniques. Exemplary steps in accordance with one embodiment of the present invention are illustrated in the flow chart of FIG. 1. Such steps will be discussed in order, beginning with a first step 100 of forming a capacitor element. As will be discussed in more detail below, such a capacitor element may correspond to a solid electrolytic capacitor body characterized by first and second opposing end surfaces and an anode wire extending from the first end surface. In general, exemplary steps in forming a capacitor element may include pressing an anode body, anodically oxidizing at least a portion of the anode body to form a dielectric layer, and forming a solid electrolyte over at least a portion of the dielectric layer. Additional details regarding these and other steps in the capacitor element formation process are now presented.

A variety of particular techniques may be employed to form and thus provide a solid electrolytic capacitor. For example, such capacitors typically contain an anode formed from a valve metal composition. The valve metal composition may have a high specific charge. In some embodiments, a specific charge may be provided from within a range of about 10,000 microFarads*Volts per gram ("µF*V/g") to about 500,000 µF*V/g in some embodiments, from within a range of about 20,000 µF*V/g to about 400,000 µF*V/g in other embodiments, and within a range of about 35,000 µF*V/g to about 250,000 µF*V/g in other embodiments. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of $1:1.0\pm1.0$, in some embodiments $1:1.0\pm0.3$, in some embodiments $1:1.0\pm0.1$, and in some embodiments, $1:1.0\pm0.05$. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. Nos. 6,322,912 to Fife; 6,391,275 to Fife et al.; 6,416,730 to Fife et al.; 6,527,937 to Fife; 6,576,099 to Kimmel, et al.; 6,592,740 to Fife, et al.; and 6,639,787 to Kimmel, et al.; and 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode body. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 m²/g, in some embodiments from about 0.5 to about 5.0 m²/g, and in some embodiments, from about 1.0 to about 2.0 m²/g. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 g/cm³, in some embodiments from about 0.2 to about 4.0 g/cm³, and in some embodiments, from about 0.5 to about 3.0 g/cm³.

To facilitate the construction of the anode body, other components may be added to the electrically conductive particles.

For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, polyethyl-2-oxazoline, etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

Once attached to the lead, the anode body may be anodized so that a dielectric layer is formed over and/or within the anode. Anodization is an electrochemical process by which the anode is oxidized to form a material having a relatively high dielectric constant. For example, a tantalum anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous, non-aqueous, acid, alkaline), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte. Additional exemplary electrolytes may include metal salts, alkali salts, alkali salt mixed with glycol, an acid mixed with organic solvent or phosphoric acid mixed with glycol.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Once the dielectric film is formed, a protective coating may optionally be applied, such as one made of a relatively insulative resinous material (natural or synthetic). Such materials may have a resistivity of greater than about 0.05 ohm-cm, in some embodiments greater than about 5, in some embodiments greater than about 1,000 ohm-cm, in some embodiments greater than about $1\times10^5$ ohm-cm, and in some embodiments, greater than about $1\times10^{10}$ ohm-cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part may be subjected to a step for forming a cathode that includes a solid electrolyte, such as a manganese dioxide, conductive polymer, etc. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, a conductive polymer coating may be employed that contains one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy-thiophene) may initially be mixed with a polymerization catalyst to form a solution. For example, one suitable polymerization catalyst is CLEVIOS C, which is iron III toluene-sulfonate and sold by H. C. Starck. CLEVIOS C is a commercially available catalyst for CLEVIOS M, which is 3,4-ethylene dioxythiophene, a PEDT monomer also sold by H. C. Starck. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. Techniques, such as described above, may be described in more detail in U.S. Publication No. 2008/232037 to Biler.

In addition, the catalyst (e.g., CLEVIOS C) may also be mixed with the material(s) used to form the optional protective coating (e.g., resinous materials). In such instances, the anode part may then be dipped into a solution containing the monomer (CLEVIOS M). As a result, the monomer can contact the catalyst within and/or on the surface of the protective coating and react therewith to form the conductive polymer coating. Techniques, such as described above, may be described in more detail in U.S. Pat. No. 7,460,358 to Biler. Although various methods have been described above, it should be understood that any other method for applying the conductive coating(s) to the anode part may also be utilized in the present invention. For example, other methods for applying such conductive polymer coating(s) may be described in U.S. Pat. Nos. 5,457,862 to Sakata, et al., 5,473,503 to Sakata, et al., 5,729,428 to Sakata, et al., and 5,812,367 to Kudoh, et al., which are incorporated herein in their entirety by reference thereto for all purposes.

Once applied, the solid electrolyte may be healed. Healing may occur after each application of a solid electrolyte layer or may occur after the application of the entire coating. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

If desired, the part may optionally be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

Generally speaking, it is desirable to electrically isolate the anode termination from the cathode termination so that the capacitor functions in the desired manner. To achieve such isolation, a variety of techniques may be implemented. In one embodiment, for instance, any oxide and/or cathode layer(s) formed on the lead may simply be removed through an etching process (e.g., chemical, laser, etc.). Likewise, a protective coating may also be formed on the anodized porous body and/or the anode lead, either prior to or after anodization, to protect it from contact with the solid electrolyte. When employed, the coating may be insulative and have a specific resistivity of greater than about 10 $\Omega$/cm, in some embodiments greater than about 100, in some embodiments greater than about 1,000 $\Omega$/cm, in some embodiments greater than about $1\times10^5$ $\Omega$/cm, and in some embodiments, greater than about $1\times10^{10}$ $\Omega$/cm. Examples of such insulative materials may include polymers, such as polyurethane, polystyrene, esters of unsaturated or saturated fatty acids (e.g., glycerides), polytetrafluoroethylene (e.g., Teflon™), and so forth.

As indicated above, the electrolytic capacitor of the present invention also contains an anode termination to which the anode lead of the capacitor element is electrically connected and a cathode termination to which the cathode of the capacitor element is electrically connected. The anode and cathode terminations and other portions may initially be provided by a leadframe. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). Termination base metals may also be coated with additional metal flashing layers, for example plated nickel, silver or the like. The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters.

The terminations may be connected using any technique known in the art, such as welding, adhesive bonding, etc. In one embodiment, for example, the anode lead/wire may be electrically connected to the anode termination by laser welding, and the outer surface of the capacitor body (i.e., the cathode) is electrically connected to the cathode termination by applying a conductive adhesive between the cathode termination and the capacitor body. Insulating material may also be provided during attachment between the capacitor body and the anode termination. The conductive adhesive may be cured afterwards. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes.

Once the capacitor element is attached, the lead frame is enclosed within a casing, which may then be filled with silica or any other known encapsulating material. The width and length of the case may vary depending on the intended application. Suitable casings may include, for instance, "A", "B", "F", "G", "H", "J", "K", "L", "M", "N", "P", "R", "S", "T", "W", "Y", or "X" cases (AVX Corporation) which should be understood by one of ordinary skill in the art to correspond to various component sizes of "XXYY" corresponding to one having a width dimension of 0.XX inches and a length dimension of 0.YY inches. Regardless of the case size employed, the capacitor element is encapsulated so that at least a portion of the anode and cathode terminations as well as the recessed leadframe channel are exposed. At least a portion of the recessed leadframe channel is removed to electrically isolate the anode and cathode terminations, and a surface groove may optionally be formed between the anode and cathode terminations on the device mounting surface. The exposed portions of the anode and cathode terminations are generally located at the bottom surface of the capacitor in a "facedown" configuration for mounting onto a circuit board. This increases the volumetric efficiency of the capacitor and likewise reduces its footprint on the circuit board. After encapsulation, exposed portions of the anode and cathode terminations may be aged, screened, and trimmed to the desired size.

In some embodiments, external terminations may be formed over the exposed anode and cathode terminations. In one example, such external terminations are formed only on the single device mounting surface to keep all device sides free of metal parts to reduce potential short circuiting in the mounting environment. In another example, wrap-around terminations may cover the exposed base anode and cathode termination portions and wrap over to one or more adjacent side surfaces.

External terminations may include one or more layers formed of any conductive material, such as but not limited to conductive metal (e.g., copper, nickel, silver, zinc, tin, palladium, lead, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). In one example, external terminations respectively include a first layer of nickel to promote leach resistance, a second layer of silver and a third layer of tin or other solder alloy to protect the under-layers from oxidation and to promote easily soldered terminations in an integrated circuit (IC) environment.

External terminations may be formed in a variety of fashions, such as by printing, vapor deposition, screen masking, sputtering, electroplating, electroless or immersion plating and the like. One method corresponds to electroplating or electrochemical deposition, wherein an electronic component with exposed conductive portions is exposed to a plating solution such as electrolytic nickel or electrolytic tin characterized by an electrical bias. The component itself is then biased to a polarity opposite that of the plating solution, and conductive elements in the plating solution are attracted to the exposed metallization of the component. Electroless plating involves full immersion of electronic components in a plating solution with no polar biasing. Still further techniques that may be utilized to form external terminations involve magnetic attraction of plating material, electrophoretics or electrostatics.

Figure 2:
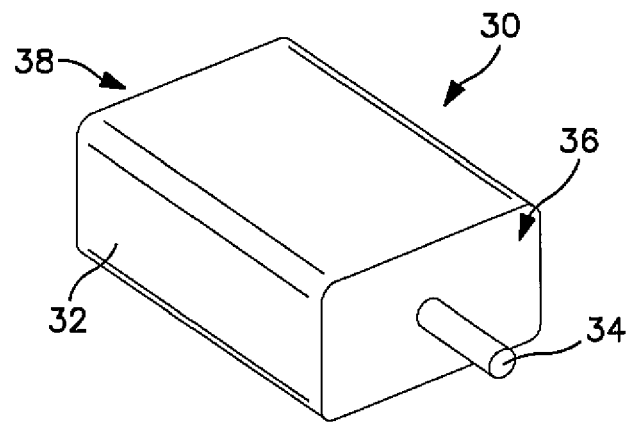
FIG. 2 is a perspective view of an exemplary electrolytic capacitor element with anode and cathode portions that may be employed in the present invention.

Referring again to the figures, formation and/or provision of a capacitor element as called for in step 100 of FIG. 1 yields a resultant structure such as that illustrated in FIG. 2. Referring now to FIG. 2, a capacitor element 30 includes a cathode 32 and anode wire 34. Capacitor element 30 is characterized by first and second opposing end surfaces 36 and 38. Anode wire 34 extends from first surface 36 of the capacitor element 30. As described above, an outer coating of the capacitor element 30 serves as the cathode 32 of the capacitor, forming a first electrical connection to the capacitor element and anode wire 34 provides a second electrical connection for the capacitor element 30. It should be appreciated that capacitor element 30 is formed such that the cathode and anode wire are not in direct electrical contact with one another. This may be facilitated by the dielectric coating applied to form the capacitor body or by an insulative cap or other portion placed around the base of the anode wire 34, such as the insulative washer 40 shown in FIG. 4.

Referring again to FIG. 1, a second exemplary step 102 involves attaching a capacitor element to a leadframe. As is known in the art, a leadframe may contain a plurality of rows and columns, each of which define a receiving location for a respective capacitor element. Such a leadframe configuration facilitates the manufacture of capacitors in bulk, although it should be appreciated that leadframes containing only a single receiving location for one capacitor element may also be utilized. Although some of the features and steps herein discuss leadframes for forming a plurality of resultant capacitive devices, it should be appreciated that the present invention should not be unnecessarily limited to bulk manufacturing steps and methods.

Figure 3:
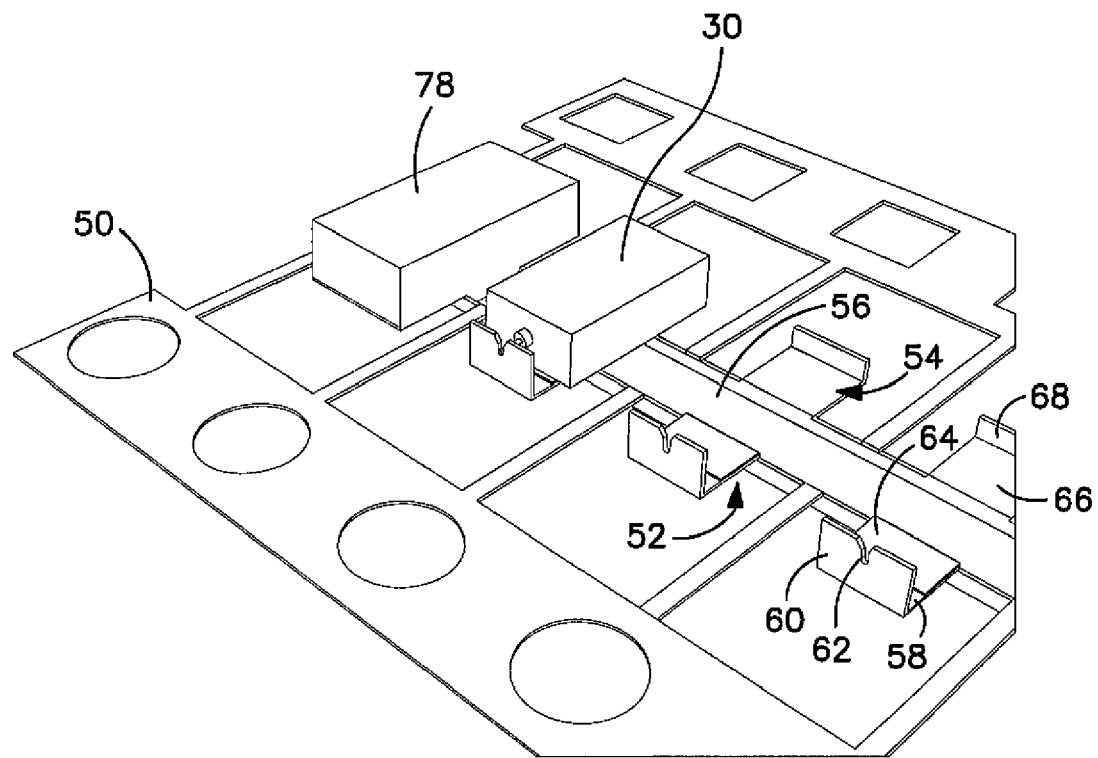
FIG. 3 is a perspective view of an exemplary leadframe in accordance with an aspect of the present invention to which capacitor elements may be attached and subsequently encapsulated.

FIG. 3 shows a portion of an exemplary leadframe 50 configured for attaching multiple capacitor elements 30 in a respective plurality of receiving locations. Each receiving location of leadframe 50 may include an anode termination 52, a cathode termination 54 and a recessed leadframe channel 56 formed and extending between the anode termination 52 and cathode termination 54.

Anode termination 52 may include a base portion 58 and an upstanding portion 60 that are generally formed to be perpendicular to one another. The upstanding anode termination portion 60 is connected to the anode lead/wire 34. In one example, upstanding anode termination portion 60 is formed with a notched groove 62 for receiving an anode lead/wire 34 of a capacitor element 30. The anode wire 34 can then be welded (e.g., by laser welding) to the upstanding anode termination portion 60. When mounted, an end surface (e.g., surface 36) of the capacitor element 30 is generally parallel to the upstanding anode termination portion 60. Base anode termination portion 58 is provided to receive and structurally support a portion of a capacitor body, but is electrically isolated from the body by providing an insulating material 64 between the capacitor body and the base anode termination portion. In one example, a portion of insulating material 64 is coated on the base anode termination portion 58 while it is still attached to leadframe 50. It should be appreciated that insulating material 64 may alternatively be first applied to the capacitor element. Insulating material 64 may be formed of insulation tape or of an insulation or non-conductive material applied to the desired leadframe locations by any suitable technique known in the art, such as vapor deposition, dispensing, or screen masking.

Cathode termination 54 may include a base portion 66 and upstanding portion 68 that are generally perpendicular to one another. The base cathode termination portion 66 and base anode termination portion 58 may be provided in a substantially coplanar relationship. The base cathode termination portion 66 is provided to receive and structurally support a portion of a capacitor body and is electrically connected to the capacitor body, for example, by a conductive adhesive such as but not limited to a silver-loaded epoxy. The upstanding cathode termination portion 68 may be optional, but provides an advantageous alignment feature for a capacitor element when provided such that an end surface (e.g., surface 38) of the capacitor element is provided adjacent to the upstanding cathode termination portion 68. Conductive adhesive may then be used to attach a capacitor element which is on leadframe 50 such that the adhesive bonds a bottom surface of the capacitor element 30 to base cathode termination portion 66. Optionally, additional adhesive may bond end surface 38 of capacitor element 30 to upstanding cathode termination portion 68.

Figure 4:
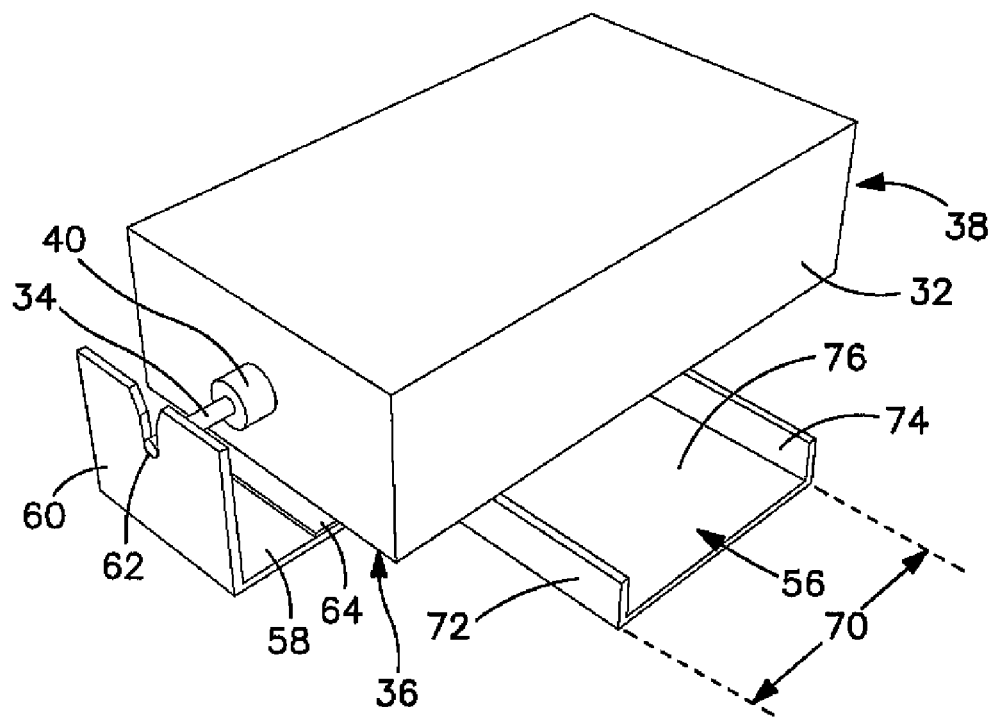
FIG. 4 provides a perspective view of an individual capacitor element mounted to anode and cathode terminations separated by an insulation channel.

As better seen from FIG. 4, the recessed leadframe channel 56 formed between and connecting the base anode termination portion 58 and base cathode termination portion 66 may include at least a portion that extends for some given width 70 away from the capacitor body and the plane in which the base anode termination portion 58 and base cathode termination portion 66 are formed. As shown in the figures, the recessed channel 56 has a generally rectangular cross section, but other cross sections such as a U-shaped cross section, V-shaped cross section or other configuration may be utilized. With the generally rectangular cross section, recessed leadframe channel includes first and second extensions 72 and 74 and a recessed surface 76 formed in a separate plane from the base anode termination portion 58 and base cathode termination portion 66.

Referring still to step 102, attaching of the capacitor element to the leadframe may involve electrically connecting the anode wire 34 to the anode termination, namely to upstanding anode termination portion 60. This may be accomplished using any technique known in the art, such as mechanical welding, laser welding, conductive adhesives, etc. For example, the anode wire 34 may be welded into the groove 62 formed within upstanding anode termination portion 60 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode wire 34 to the upstanding anode termination portion 60, the conductive adhesive used to electrically connect the cathode to the cathode termination may be cured. For example, a heat press may be used to apply heat and pressure to ensure that the capacitor element 30 is adequately adhered to the cathode termination by the adhesive.

Figure 5:
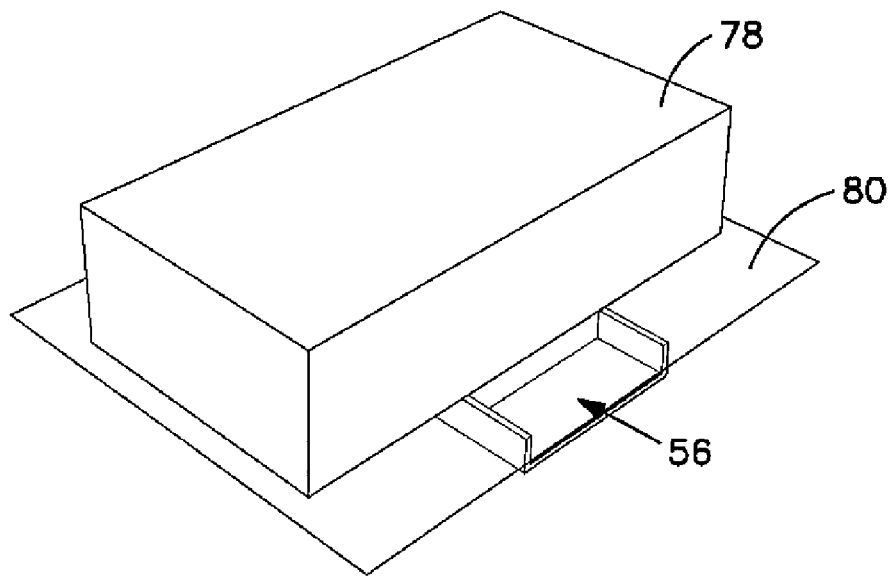
FIG. 5 provides a generally top perspective view of an individual capacitor element mounted to anode and cathode terminations separated by an insulation channel after encapsulation.
Figure 6:
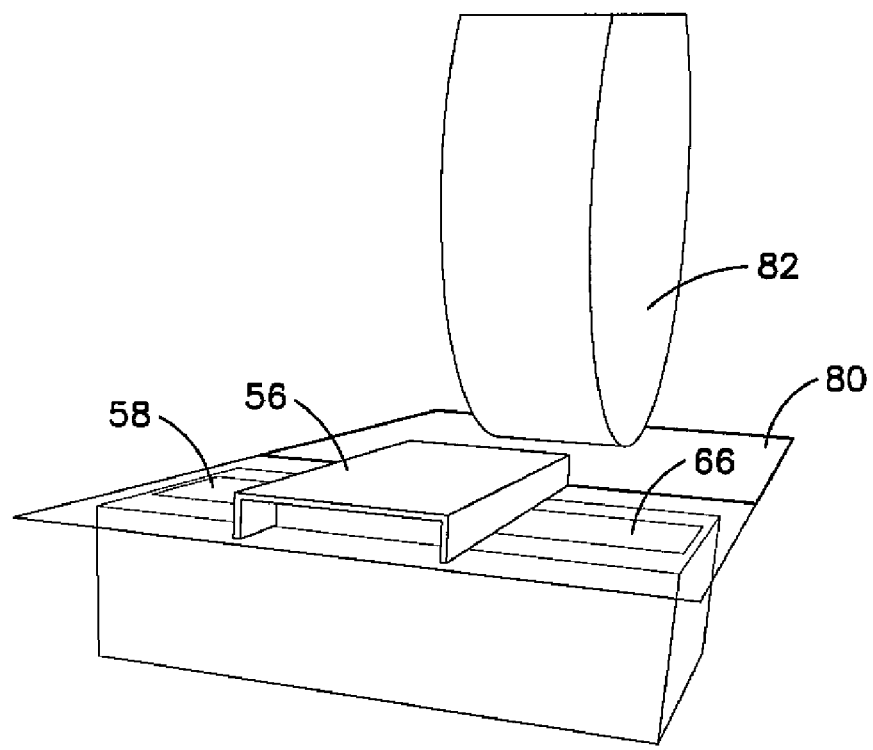
FIG. 6 provides a generally bottom perspective view of an individual capacitor element mounted to anode and cathode terminations separated by an insulation channel after encapsulation and as introduced to a grinding wheel for removing the channel and isolating the anode and cathode terminations.
Figure 7:
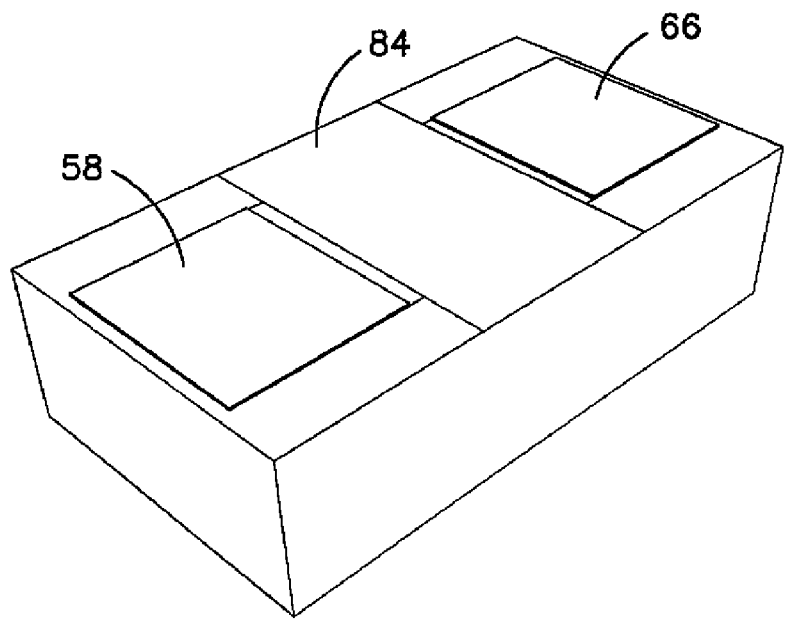
FIG. 7 provides a generally bottom perspective view of an individual capacitor element with a groove formed to isolate the anode and cathode terminations.

Referring still to FIG. 1, another step 104 involves encapsulating each capacitor element, for example, in a resin casing 78 as shown in FIGS. 3 and 5. In one example, each capacitor element 30 and respective portions of leadframe 50 is enclosed within a resin casing, which may then be filled with silica or any other known encapsulating material. Suitable casings may include, for instance, "F", "G", "H", "J", "K", "L", "N", "P", "R", "S", "T", "W", "Y", or "X" cases (AVX Corporation). The encapsulating case 78 provides additional structural and thermal protection for the resultant capacitor. In one example, each encapsulating case 78 substantially covers an entire capacitor element 30 as well as at least part of leadframe 50. In some embodiments, as shown in FIGS. 5-6, the encapsulating case leaves at least a portion of the base anode termination portion 58 and base cathode termination portion 66 as well as recessed leadframe channel 56 exposed.

Step 106 then involves removing at least a portion of leadframe channel 56 to isolate the anode and cathode terminations for each capacitor. In one example, as shown in FIG. 6, the entire recessed leadframe channel is removed down to planar surface 80, leaving only the base anode termination portion 58 and base cathode termination portion 66 exposed for mounting. In one example, a grinding wheel 82 is used to remove the recessed leadframe channel 56. Additional removal techniques, such as sawing, laser cutting, water cutting, etching, grinding or other known methods may be used in step 106.

The remaining exposed surfaces of the base anode termination portion 58 and base cathode termination portion 66 may be used to directly provide first and second opposing polarity electrical connections for the resultant capacitor. In some embodiments, separate first and second external terminations are respectively applied over the base anode and cathode termination portions as indicated in optional step 108.

Additional steps (not illustrated in FIG. 1) may involve a trimming, or cutting step, by which the leadframe is divided into a plurality of respective capacitors. Exposed termination portions may be aged, screened, and trimmed to remove excess portions thereof.

As a result of the present invention, a capacitor assembly may be formed with good volumetric efficiency. In addition, a device may be provided that only has exposed terminations on a single mounting surface leaving all other surfaces free from metallic components. After such a device is mounted, the risk of a short circuit from contact between components on a printed circuit board is significantly reduced or eliminated. Still further, a capacitor assembly is formed that exhibits excellent electrical properties. For instance, the capacitor may exhibit a high capacitance and a low equivalent series resistance (ESR), which refers to the extent that the capacitor has resistance in series with capacitance, which delays charging and discharging and causes losses in electronic circuit. The present invention may be better understood by reference to the following example.

TEST PROCEDURES

Equivalent Series Resistance (ESR), Capacitance, and Dissipation Factor:

Equivalent series resistance was measured using a Hewlett Packard 4192A LCZ meter with 0 volts bias and 1 volt signal. The operating frequency was 100 kHz. The capacitance and dissipation factor were measured using a Hewlett Packard 4192A LCZ meter with 2 volts bias and 1 volt signal. The operating frequency was 120 Hz and the temperature was 23° C.±2° C.

Leakage Current:

Leakage current ("DCL") was measured using a Keithley 2400 source meter. The Keithley 2400 measures leakage current at a temperature of 23° C.±2° C. and at a 1.1× rated voltage after 30 seconds of soak time.

EXAMPLE 1

A capacitor was constructed in accordance with the present invention as described above. Specifically, a capacitor was constructed having a 1210 "T" case size and performance parameters of about 150 µF and 6.3 Volts. Anodes were pressed on side presses from STA150KA tantalum powder manufactured by H. C. Starck (rated with a specific charge of about 150,000 µF*V/g). Anode dimensions correspond to length of about 2.3 mm, width of about 2.3 mm and thickness of about 0.85 mm with a 0.17 mm wire in the center of the anode. A dielectric layer was formed over the anode by a conventional anodic oxidation process, over which a conductive polymer PEDT coating was applied to form the cathode layer. Anodes were welded onto leadframes, such as shown in FIG. 3, which were made of Hitachi Alloy 42 NILO base material plated by nickel and silver flashes. Before welding, isolation between the base portion of the anode termination and the outer cathode layer of the capacitor element was provided by a coating of non-conductive paste (e.g., Henkel/Loctite QM1534) and cured at 150° C. for 15 minutes. Silver loaded epoxy (Protavic ACE10131) was applied on the base portion of the cathode termination to ensure good contact between silvered capacitor portion and the lead frame. Attachment of the capacitor element to the leadframe was achieved by laser welding the anode wire to the anode termination and using conductive adhesive to attach the cathode layer of the capacitor element to the cathode termination. The conductive adhesive was silver-loaded epoxy that was cured at a temperature of $195_{-5}^{+10°}$ C. for about 40 seconds. The lead frame and capacitor element was encapsulated with a Henkel/Loctite GR2710 yellow colored mold having a 1210 "T" case size (EIA "B" case footprint with max height 1.2 mm). The groove channel between the anode and cathode terminations was cut in the middle starting from the bottom part of the width of 0.5 mm and the depth of 0.3 mm to ensure possibility of electrical testing and creating of two separate polarity terminations. Afterwards, conventional reflow, deflash and coding steps were taken. Finished components were aged at 1.0 times the rated voltage at 125° C. for about two (2) hours, after which point various electrical properties were tested. The results are set forth below in Table 1. Finally, groove portion was grinded away and pieces were placed into strips. Then the strips were packed using standard reel and tape technology.

TABLE 1

Electrical Properties (Median of Measured Values)

| Parameter | Value |
| --- | --- |
| Capacitance (µF) | 137.2 |
| Dissipation Factor (%) | 0.042 |
| ESR (Ω) | 0.127 |
| Leakage Current - DCL (µA) | 9.6 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming a solid electrolytic capacitor, comprising:
    attaching a capacitor element having a capacitor body and an anode lead to a leadframe, wherein the leadframe comprises an anode termination having at least a base anode termination portion for supporting part of the capacitor body and an upstanding anode termination portion for connecting to the anode lead, a cathode termination having at least a base cathode termination portion for supporting part of the capacitor body, and a recessed leadframe channel formed between and connecting the base anode termination portion and the base cathode termination portion;
    encapsulating the capacitor element in a casing such that at least a portion of the base anode termination portion, base cathode termination portion and recessed leadframe channel remain exposed; and
    removing the recessed leadframe channel to isolate the anode and cathode terminations.

2. The method of claim 1, further comprising applying an insulating material between the base anode termination portion and the capacitor body.

3. The method of claim 1, wherein attaching a capacitor element to a leadframe comprises:
    applying an insulating material between the base anode termination portion and the capacitor body;
    applying a conductive material between the base cathode termination portion and the capacitor body;
    welding the anode lead to the upstanding anode termination portion.

4. The method of claim 1, further comprising forming a capacitor element.

5. The method of claim 4, wherein forming a capacitor element comprises;
    pressing an anode body;
    anodically oxidizing at least a portion of the anode body to form a dielectric layer; and
    forming a solid electrolyte over at least a portion of the dielectric layer.

6. The method of claim 5, wherein the anode body includes tantalum, niobium, or an electrically conductive oxide thereof.

7. The method of claim 5, wherein the solid electrolyte includes manganese dioxide or a conductive polymer.

8. The method of claim 1, wherein removing the recessed leadframe channel comprises one of cutting, grinding or sawing the recessed leadframe channel.

9. The method of claim 1, wherein the base anode termination portion and base cathode termination portion are generally coplanar.

10. The method of claim 1, further comprising forming a groove on the surface of the capacitor between the base anode termination portion and the base cathode termination portion.

11. The method of claim 1, further comprising forming a first external termination over the base anode termination portion and forming a second external termination over the base cathode termination portion.

12. A capacitor formed by one of the methods set forth in claims 1 through 11.

* * * * *